United States Patent
Zimmer

(10) Patent No.: US 7,506,400 B2
(45) Date of Patent: Mar. 24, 2009

(54) WIPER ARM

(75) Inventor: Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 804 days.

(21) Appl. No.: 10/951,046

(22) Filed: Sep. 23, 2004

(65) Prior Publication Data

US 2005/0060830 A1   Mar. 24, 2005

(30) Foreign Application Priority Data

Sep. 23, 2003   (DE) ................. 103 43 938

(51) Int. Cl.
 B60S 1/46   (2006.01)
 B60S 1/52   (2006.01)
 B60S 1/34   (2006.01)
(52) U.S. Cl. ............... 15/250.04; 15/250.351; 15/250.201
(58) Field of Classification Search ........... 15/250.04, 15/250.01, 250.351, 250.352, 250.02, 250.07; 239/570, 571, 284.1, 284.2
See application file for complete search history.

(56) References Cited

U.S. PATENT DOCUMENTS

| | | | | |
|---|---|---|---|---|
| 4,517,704 A | * | 5/1985 | Benson ................ | 15/250.04 |
| 6,100,499 A | * | 8/2000 | Davila, Sr. ............ | 219/202 |
| 6,119,300 A | * | 9/2000 | Schmid et al. ........ | 15/250.04 |
| 6,442,788 B1 | * | 9/2002 | Fleischer ............. | 15/250.04 |
| 6,463,621 B1 | * | 10/2002 | Zimmer et al. ........ | 15/250.04 |
| 6,604,692 B2 | * | 8/2003 | Utz et al. ............. | 239/284.1 |
| 2005/0060830 A1 | * | 3/2005 | Zimmer ............... | 15/250.04 |

FOREIGN PATENT DOCUMENTS

DE   19815171   6/1999

* cited by examiner

Primary Examiner—Lee D Wilson
(74) Attorney, Agent, or Firm—Michael Best & Friedrich LLP

(57) ABSTRACT

The invention starts with a wiper arm (10, 28; 42, 44) with at least one fan nozzle (20, 46, 70, 88) through which wash water is sprayed on an as-needed basis in a fan stream (22, 54, 76, 78, 90, 94, 98, 102, 106, 110, 114) onto a part of vehicle window (68) lying in the wiper direction (58, 59) in front of a wiper blade (16, 18; 36, 48), wherein the fan stream (22, 54, 76, 78, 90, 94, 98, 102, 106, 110, 114) hits the vehicle window (68) in the area of an impact line (24, 56, 80, 82, 92, 96, 100, 104, 108). It is proposed that the impact line (24, 56, 80, 82, 92, 96, 100, 104, 108) essentially runs parallel to the wiper blade (16, 18; 36, 48).

15 Claims, 5 Drawing Sheets

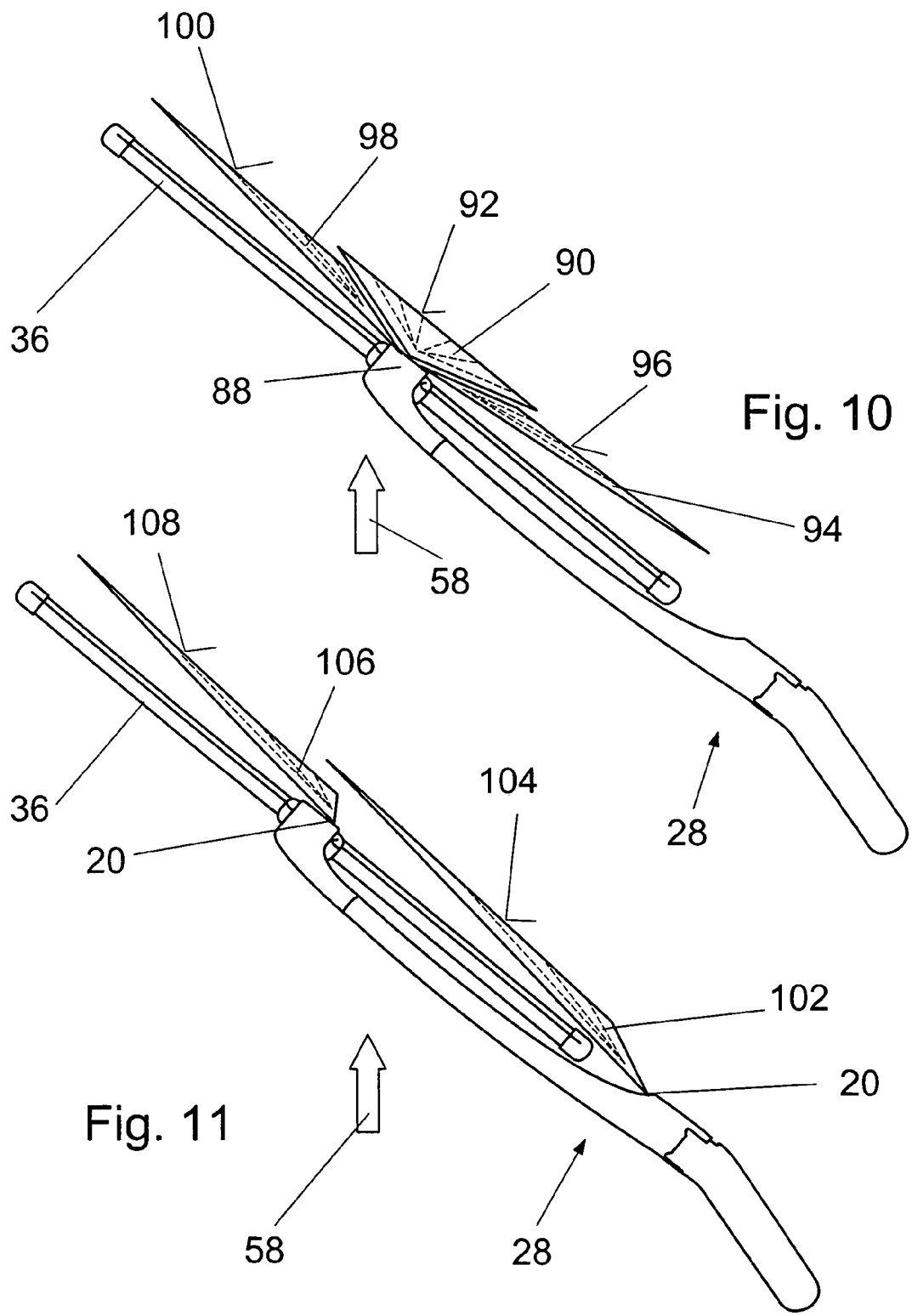

WIPER ARM

BACKGROUND OF THE INVENTION

A wiper arm which has spray nozzles arranged on its articulated part or rather on a wiper rod connected as a single piece to the articulated part is known from DE 198 15 171 A1 These spray nozzles are located in a nozzle body, which is housed in an indentation of the articulated part with a spray opening for the spray stream or clipped in, projecting downward, in a lateral holding device on the wiper rod. Even two nozzle bodies can be provided, which are connected to one another by a rigid or flexible connecting piece. The nozzle bodies are easy to replace and are well protected against environmental influences.

Fan nozzles are also known, which generate a fan stream by the nozzle opening being embodied as a slot that the fan plane determines or by several nozzle outlets being arranged in a fan plane. The fan nozzles are arranged on the side of the wiper arm that points in the upward direction and its fan stream has a slight inclination toward the vehicle window, wherein the impact line of the fan stream on the vehicle window is inclined and runs at a considerable distance to the wiper blade. Therefore, the fan stream provides the air stream with a large contact surface so that it blows a great portion of the wash water over the vehicle window into the surrounding area. As a result, a relatively large amount of wash water is required, which increases costs and harms the environment, particularly if cleaning compounds and antifreeze agents have been added to the wash water as usually is the case.

SUMMARY OF THE INVENTION

According to the invention, the impact line of the fan stream essentially runs parallel to the wiper blade so that the impact line can run very close alongside the wiper blade. As a result, the fan stream lies in the area of the wiper blade and wiper arm that is sheltered from the wind and provides the air stream with little or no contact surface. Because of the small steam path length, a high percentage of the wash water reaches the window and can therefore be used optimally for cleaning. In addition, this is advantageous because the wetting of the vehicle window occurs only for a short time, the cleaning compound is washed away again relatively quickly and is therefore hardly perceptible to the driver. However, it is crucial that the cleaning process take place without obstructing visibility, something that represents a substantial gain in safety. The fan nozzles can also be arranged on both sides of the wiper arm, which even though this is connected with greater expense, it offers the advantage that wash water can be sprayed in a timed process in both an upward direction as well as a downward direction always in front of the wiper blade.

It has been shown that favorable wiper results are achieved if, in accordance with an embodiment of the invention, the fan plane of the fan stream encloses, with a longitudinal center plane of the wiper blade, an angle α that is less than thirty degrees.

Since the distance between the wiper blade and the impact line of the fan stream is very small, it is advantageous that the fan nozzle be embodied in such a way that the length of the impact line corresponds approximately to the length of the wiper blade. This results in a uniform water distribution over the length of the wiper blade. However, the fan nozzle can also features several nozzle outlets and generate several fan streams, whose impact lines correspond in terms of the sum of their lengths to the length of the wiper blade. This type of fan nozzle is expediently arranged approximately in the center of the wiper blade, i.e., in the area of the articulated connection between the wiper arm and the wiper blade. Thus, a fan stream can run in the direction of the articulated part, while another fan stream is directed toward the free end of the wiper blade. Under some circumstances, a third fan stream between the cited fan streams can have a direction component directed transverse to the wiper blade. In order to achieve optimal wetting of the vehicle window, it is advantageous if the fan streams are somewhat offset transverse to the wiper blade so that their impact lines can overlap in the longitudinal direction of the wiper blade without the fan streams having a mutual negative effect.

As a rule, the fan nozzles are actuated during the upward movement of the wiper blade, wherein the fan streams lie in the area of the wiper blade and wiper arm that is sheltered from the wind during a great majority of the wiper movement. In the case of wiper arrangements in which the wiper blade is also subjected to air flow in the longitudinal direction, something that is frequently the case on the passenger side of the vehicle, it is expedient that several fan nozzles be provided in an offset manner in the longitudinal direction of the wiper arm instead of one central fan nozzle with several nozzle outlets and that the fan streams from these fan nozzles be directed towards the free end of the wiper blade. As a result, the fan stream operates in the same direction as the inflow of the air stream in the case of longitudinal inflow.

The fan nozzle arrangement in accordance with the invention is suitable for all wiper arm concepts, i.e., for all wiper arms, which are connected in accordance with a top-lock principle or a side-lock principle with a conventional wiper blade with a supporting bracket system or with a non-articulated wiper blade. Moreover, it is not important whether the wiper arm follows the wiper blade in an upward motion or runs in front of it. Finally, the invention can also be used for wiper arms, which do not feature a fastening part and articulated part, but are manufactured from a continuous elastic element.

BRIEF DESCRIPTION OF THE DRAWINGS

Additional advantages are yielded from the following description of the drawings. Exemplary embodiments of the invention are depicted in the drawings. The drawings, the description and the claims contain numerous features in combination. The expert will also observe individual features expediently and combine them into additional, meaningful combinations.

The drawings show:

FIG. 10 A variation of FIG. 7.

FIG. 11 A variation of FIG. 4.

DETAILED DESCRIPTION

Figure 1:
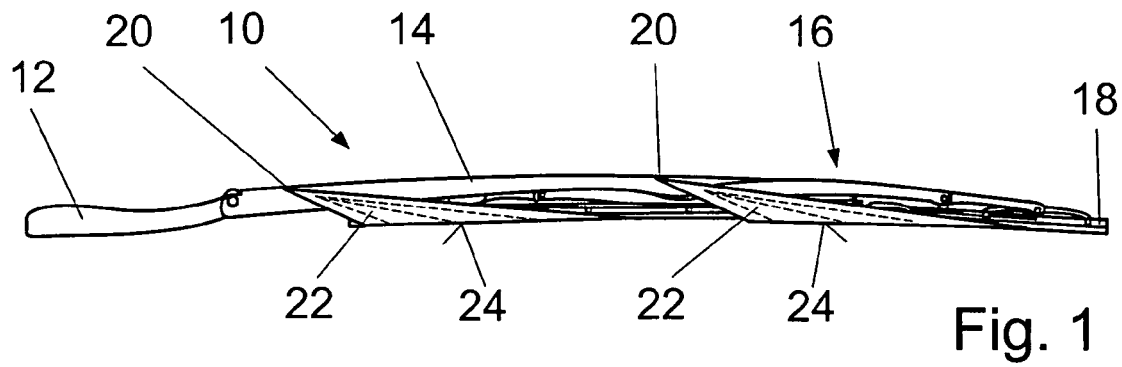
FIG. 1 A schematic side view of a wiper arm in the downward direction with a conventional wiper blade.
Figure 2:
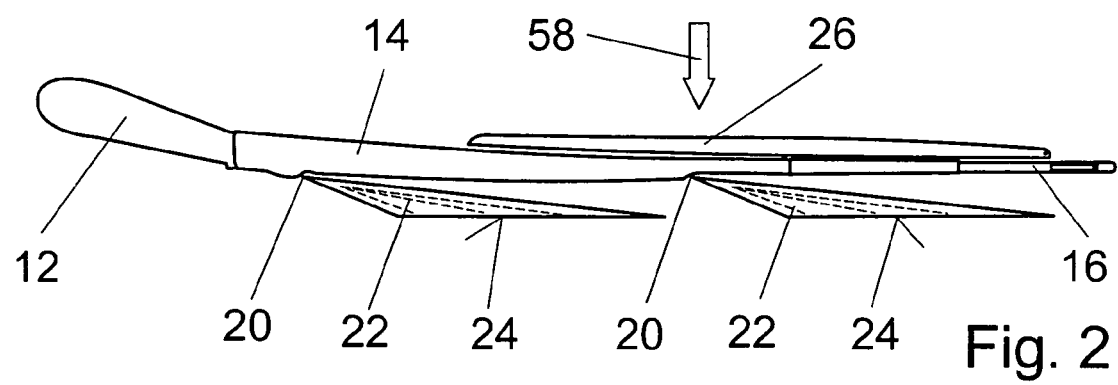
FIG. 2 A top view of a wiper arm according to FIG. 1.
Figure 6:
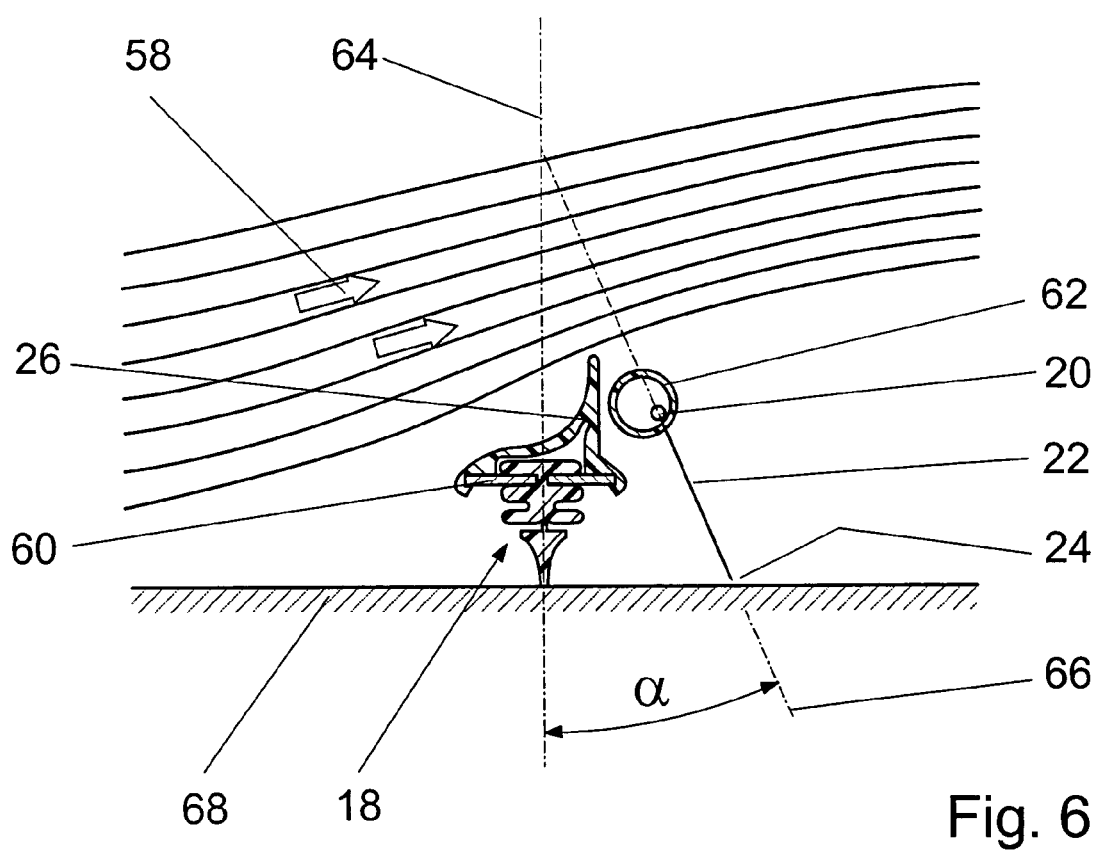
FIG. 6 A cross-section corresponding to Line VI-VI in FIG. 4.

A wiper arm 10 in accordance with FIGS. 1 and 2 has a fastening part 12, which is connected in an articulated manner with an articulated part 14. Linked to this is a wiper blade with a supporting bracket system 16 of a convention design according to the top-lock principle in the usual manner. The supporting bracket system 16 holds a wiper strip 18, which glides in the usual manner over a vehicle window 68 during wiper movement (FIG. 6). An arrow 58 indicates the upward direction of the wiper arm 10 during wiper movement. It essentially corresponds to the inflow direction of the air stream in the wiper arm's 10 parked position. Fan nozzles 20 are provided in an offset manner in the longitudinal direction of the wiper arm 10 on the side of the wiper arm 10 facing away from the air stream, and the fan streams 22 of these fan nozzles hit the vehicle window 68 in the area of an impact line 24. The total of the lengths of the impact lines 24 essentially corresponds to the length of the wiper strip 18. Moreover, as FIG. 2 shows, the impact lines 24 essentially run parallel to the wiper strip 18 or the supporting bracket system 16 and are at a short distance from it. A spoiler 26 is fastened on the supporting bracket system 16 or on the articulated part 14 on the side of the wiper arm 10 that faces the air stream.

Figure 3:
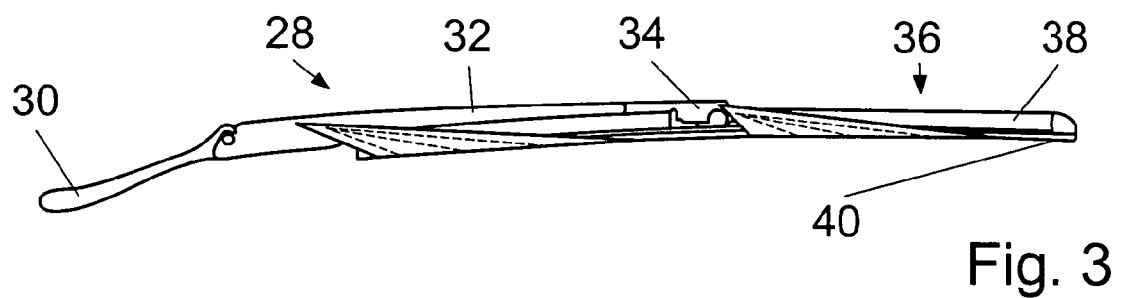
FIG. 3 A schematic side view of a wiper arm in the downward direction with a non-articulated wiper blade.
Figure 4:
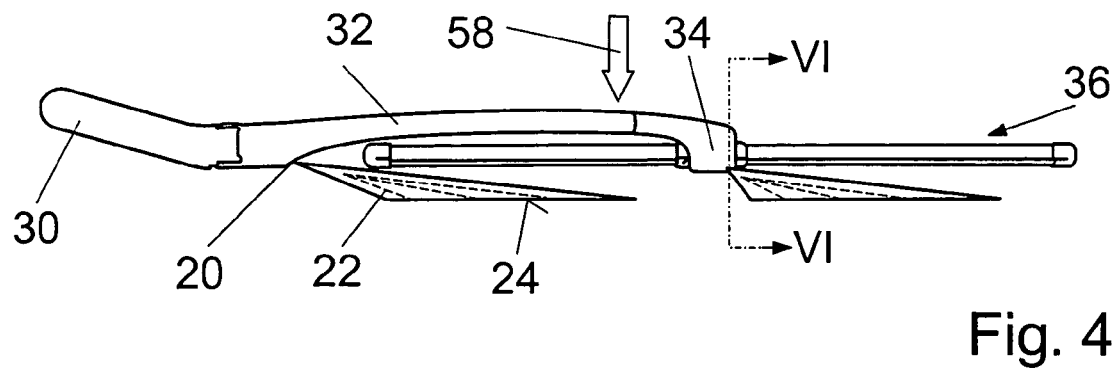
FIG. 4 A top view of a wiper arm according to FIG. 3.

In the embodiment according to FIGS. 3 and 4, a wiper arm 28 has a fastening part 30 and an articulated part 32, which is connected via an articulated connection 34 according to the side-lock principle with a non-articulated wiper blade 36. In addition to a spoiler 38, the non-articulated wiper blade 36 has a wiper strip 40 in which spring rails 60 are laterally embedded as supporting elements. The articulated connection 34 and a spoiler 26 are fastened to these (FIG. 6). The articulated part 32 follows the wiper blade 36 in the upward movement 58. On the side of the spoiler 26 that faces away from the air stream, two fan nozzles 20 are provided in an offset manner on the articulated part 32 in the longitudinal direction. These fan nozzles are supplied with wash water via a water channel 62. FIG. 6 clearly shows that the fan stream 22 of the fan nozzle 20 lies in the area of the wiper blade 36 that is sheltered from the wind. In this connection, it is expedient that the impact line 24 of the fan stream 22 lies close to the wiper blade 36. The fan plane 66 of the fan stream 22 expediently forms, with a center wiper blade plane 64, an angle α that is less than thirty degrees.

Figure 5:
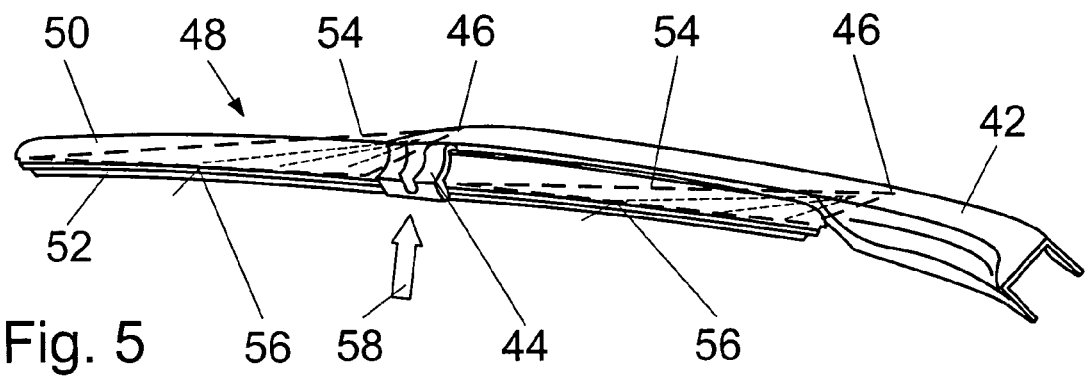
FIG. 5 A variation of FIG. 4.

The embodiment according to FIG. 5 shows the articulated part 42 of a wiper arm, which is linked via an articulated connection 44 to a non-articulated wiper blade 48 according to the side-lock principle. The articulated part 42 lies in the upward direction 58 in front of the wiper blade 48, which includes a spoiler 50 and a wiper strip 52. On the side of the articulated part 42 that faces away from the air stream, a fan nozzle 46, which generates fan streams 54 with associated impact lines 56, is provided in both the area of the articulated connection 44 and offset towards the drive-side end of the articulated part 42. The fan streams 54 are protected from the air stream by the wiper blade 48 and the articulated part 42 and are indicated by a dashed line.

Figure 7:
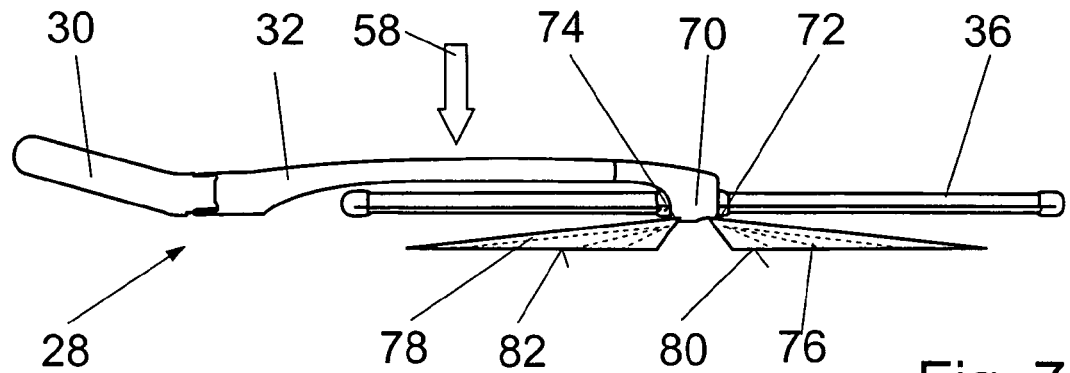
FIG. 7 A variation of FIG. 4.

Instead of the two fan nozzles 20 or 46 arranged in an offset manner in the longitudinal direction, the variation according to FIG. 7 has one central fan nozzle 70 with two nozzle outlets 72 and 74, and the nozzle outlet 72 generates a fan stream 76 pointing towards the free end of the wiper blade 36, whose impact line is designated with 80. The other nozzle outlet 74 generates a fan stream 78 in the direction towards the fastening part 30. The fan stream 78 has an impact line 82.

Figure 8:
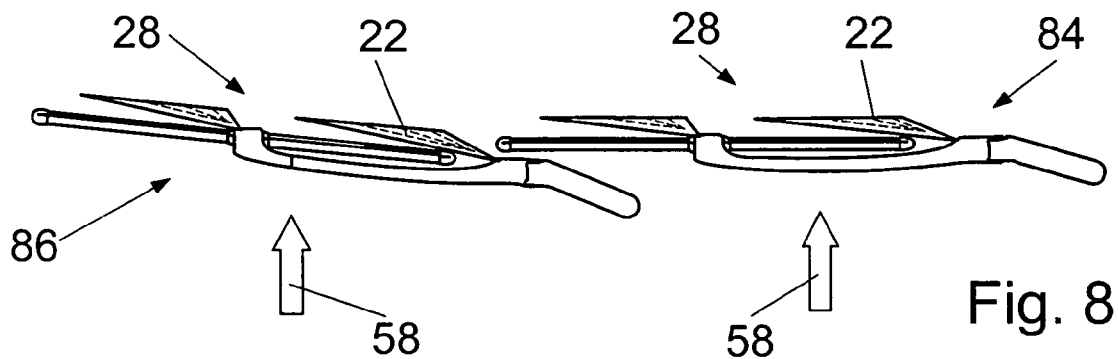
FIG. 8 A wiper arm combination for the driver's side and the passenger side of a motor vehicle.
Figure 9:
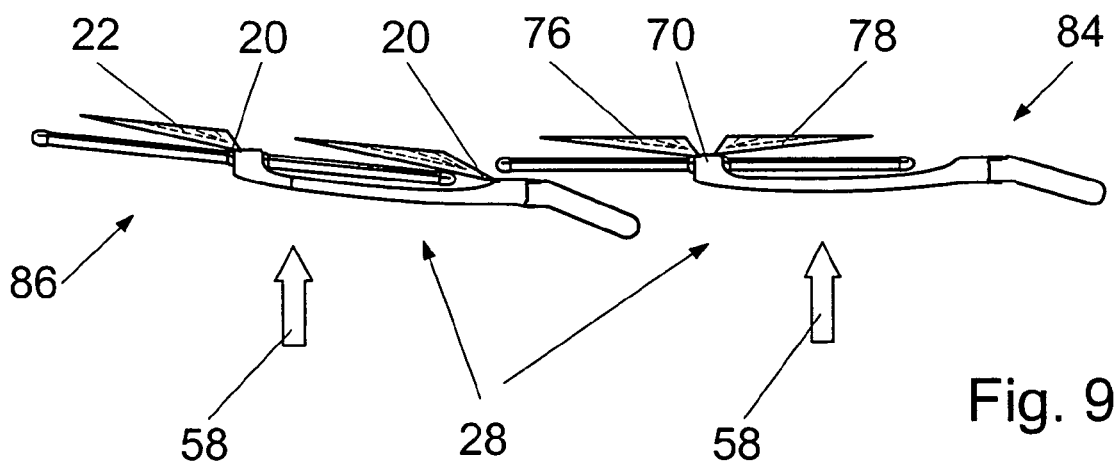
FIG. 9 A variation of FIG. 8.

FIG. 8 depicts a wiper arrangement for a motor vehicle, in which the both wiper arms, i.e., the one for the driver's side 84 and the one for the passenger side 86, are configured in the same manner. The wiper arms 28 are depicted in the initial position, the parked position. In a reverse position, the wiper arm 28 is subjected to air flow in the longitudinal direction primarily on the passenger's side 86, wherein it is advantageous if the fan streams 22 are directed in the direction towards the free end of the wiper blade 36 and operate in the direction of the inflowing air. Since the wiper arm 28 on the driver's side 84 is actuated as a rule via a smaller pivoting angle, it is subjected to air flow by the air stream only with a negligible component in the longitudinal direction. As a result, the more economical variation as per FIG. 7 with one central fan nozzle 70 can be selected on the driver's side 84.

The central fan nozzle 88 according to FIG. 10 also has several nozzle outlets, which generate fan streams, 90, 94, 98 with associated impact lines 92, 96, 100. In this connection, the fan streams 90, 94, 98 are somewhat offset transverse to the wiper blade 36 so that their impact lines 92, 96, 100 can overlap in the longitudinal direction of the wiper blade 36. Thus, one fan nozzle 88 can cover the entire length of the wiper blade 36 with a uniform water distribution.

The variation according to FIG. 11 depicts a solution with two fan nozzles 20, which generate fan streams 102 and 106 with corresponding impact lines 104 and 108. In this connection, the impact line 104 runs offset to the impact line 108 transverse to the wiper blade 36 and overlaps the impact line 108 in a center area of the wiper blade 36. Since the fan streams 102, 106 are directed in the direction of a possible longitudinal inflow of air against the wiper blade, this arrangement is especially suitable for a mixed inflow of air against the wiper blade 36.

Figure 12:
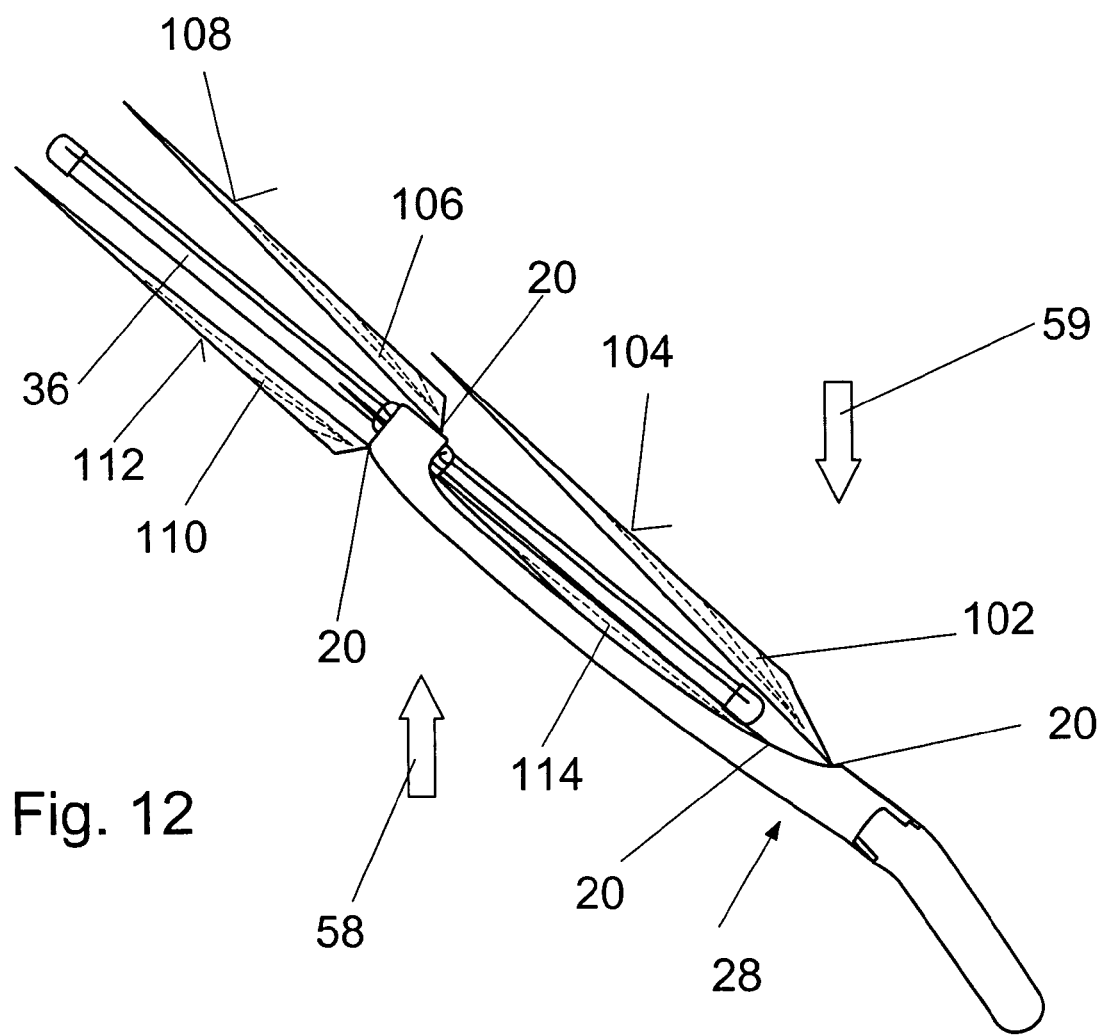
FIG. 12 A variation of FIG. 11.

The variation according to FIG. 12 depicts a wiper arm 28 with several fan nozzles 20, three of which are arranged on the forward side of the wiper arm 28 in the upward direction 58, while a fourth fan nozzle 20 is provided on the opposite side or on the front side of the wiper arm 28. Two of the fan nozzles 20 each generate a fan stream 102 or 106, whose impact lines 104 or 108 lie in the upward direction in front of the wiper blade 36. The two other fan nozzles 20 each generate a fan stream 110 or 114, whose impact lines lie in the downward direction 59 in front of the wiper blade 36. Reference number 112 designates the impact line of the fan stream 110, while the wiper arm 28 obscures the impact line of fan stream 114. The fan nozzles 20 are triggered in a timed manner in accordance with the wiper movement of the wiper arm 28 or wiper blade 36 so that fan streams 102, 106, or 110, 114 are generated only on the side of the wiper blade 36 that is forward in terms of the wiping direction.

The invention claimed is:

1. Wiper arm (10, 28, 42, 44) for use on a vehicle window, the wiper arm having at least one fan nozzle (20, 46, 70, 88) through which wash water is sprayed on an as-needed basis in a fan stream (22, 54, 76, 78, 90, 94, 98, 102, 106, 110, 114) onto a part of the vehicle window (68) in front of a wiper blade (16, 18; 36, 48) in the direction of movement (58, 59) of the wiper arm, wherein the fan nozzle (20, 46, 70, 88) is configured such that, when the wiper arm is used on the vehicle window under normal operating conditions, the fan stream (22, 54, 76, 78, 90, 94, 98, 102, 106, 110, 114) hits the vehicle window (68) in the area of an impact line (24, 56, 80, 82, 92, 96, 100, 104, 108), such that the impact line (24, 56, 80, 82, 92, 96, 100, 104, 108) essentially runs parallel to the wiper blade (16, 18; 36, 48) such that the length of the impact line (24, 56, 80, 82, 92, 96, 100, 104,108) corresponds to substantially the entire length of the wiper blade (16, 18; 36, 48).

2. Wiper arm (10, 28; 42, 44) according to claim 1, characterized in that the fan plane (66) of the fan stream (22, 54,

76, 78, 90, 94, 98, 102, 106, 110, 114) encloses, with a longitudinal center plane (64) of the wiper blade (16, 18; 36, 48), an angle (α) that is less than 30°.

3. Wiper arm (28) according to claim 1, characterized in that a fan nozzle (70, 88) features several nozzle outlets (72, 74) and generates several fan streams (76, 78, 90, 94, 98), the nozzle outlets being configured to spray the respective fan streams on the vehicle window in the area of respective impact lines, the impact lines (80, 82, 92, 96, 100) corresponding in terms of their overall length to the length of the wiper blade (16, 18; 36, 48).

4. Wiper arm (10, 28; 42, 44) according to claim 3, characterized in that the fan streams (90, 94, 98; 102, 106, 110, 114) are arranged offset from one another transverse to the wiper blade (36) and the respective impact lines (92, 96, 100; 104, 108) overlap in the longitudinal direction of the wiper blade (36).

5. Wiper arm (10, 28; 42, 44) according to claim 1, characterized in that at least two fan nozzles (20) are arranged in an offset manner in the longitudinal direction of the wiper arm (10, 28; 42, 44).

6. Wiper arm (10, 28; 42, 44) according to claim 5, characterized in that the fan streams (90, 94, 98; 102, 106, 110, 114) are arranged offset from one another transverse to the wiper blade (36) and the respective impact lines (92, 96, 100; 104, 108) overlap in the longitudinal direction of the wiper blade (36).

7. Wiper arm (10, 28; 42, 44) according to claim 1, characterized in that the fan stream (22, 54, 76, 90, 98, 102, 106, 110, 114) is directed toward the free end of the wiper blade (16, 18; 36).

8. Wiper arm (10, 28; 42, 44) according to claim 1, characterized in that several fan nozzles (20, 46, 70, 88) are arranged in such a way that at least one fan stream (22, 54, 76, 90, 98, 102, 106) hits the vehicle window (68) in the upward direction (58) and at least another fan stream (110, 114) in the downward direction (59), wherein the fan nozzles (20, 46, 70, 88) are actuated in a timed manner in accordance with the wiper movement.

9. Wiper arm (10, 28, 42, 44) for use on a vehicle window, the wiper arm having at least one fan nozzle (20, 46, 70, 88) through which wash water is sprayed on an as-needed basis in a fan stream (90, 94, 98; 102, 106) onto a part of the vehicle window (68) in front of a wiper blade (16, 18; 36, 48) in the direction of movement (58, 59) of the wiper arm, wherein the fan nozzle (70, 88) is configured such that, when the wiper arm is used on the vehicle window under normal operating conditions, the fan stream (90, 94, 98; 102, 106) hits the vehicle window (68) in the area of an impact line (92, 96, 100; 104, 108), such that the impact line (92, 96, 100; 104, 108) essentially runs parallel to the wiper blade (16, 18; 36, 48), wherein several fan streams are generated and sprayed on the vehicle window in the area of respective impact lines, wherein the fan streams (90, 94, 98; 102, 106, 110, 114) are arranged offset from one another transverse to the wiper blade (36) and the respective impact lines (92, 96, 100; 104, 108) overlap in the longitudinal direction of the wiper blade (36).

10. Wiper arm (10, 28; 42, 44) according to claim 9, characterized in that the length of the impact line (24, 56, 80, 82, 92, 96, 100, 104, 108) corresponds to substantially the entire length of the wiper blade (16, 18; 36, 48).

11. Wiper arm (28) according to claim 9, characterized in that a fan nozzle (70, 88) features several nozzle outlets (72, 74) and generates several fan streams (76, 78, 90, 94, 98), the nozzle outlets being configured to spray the respective fan streams on the vehicle window in the area of respective impact lines, the impact lines (80, 82, 92, 96, 100) corresponding in terms of their overall length to substantially the entire length of the wiper blade (16, 18; 36, 48).

12. Wiper arm (10, 28; 42, 44) according to claim 9, characterized in that at least two fan nozzles (20) are arranged in an offset manner in the longitudinal direction of the wiper arm (10, 28; 42, 44).

13. Wiper arm (10, 28; 42, 44) according to claim 9, characterized in that the fan plane (66) of the fan stream (22, 54, 76, 78, 90, 94, 98, 102, 106, 110, 114) encloses, with a longitudinal center plane (64) of the wiper blade (16, 18; 36, 48), an angle (α) that is less than 30°.

14. Wiper arm (10, 28; 42, 44) according to claim 9, characterized in that the fan stream (22, 54, 76, 90, 98, 102, 106, 110, 114) is directed toward the free end of the wiper blade (16, 18; 36).

15. Wiper arm (10, 28; 42, 44) according to claim 9, characterized in that several fan nozzles (20, 46, 70, 88) are arranged in such a way that at least one fan stream (22, 54, 76, 90, 98, 102, 106) hits the vehicle window (68) in the upward direction (58) and at least another fan stream (110, 114) in the downward direction (59), wherein the fan nozzles (20, 46, 70, 88) are actuated in a timed manner in accordance with the wiper movement.

* * * * *